Patented July 6, 1954

2,683,169

UNITED STATES PATENT OFFICE 2,683,169

PREPARATION OF ORGANO PHOSPHONYL CHLORIDES FROM ORGANO HALIDES

Warren Jensen, Ponca City, Okla., and James O. Clayton, Berkeley, Calif., assignors to California Research Corporation, San Francisco, Calif., a corporation of Delaware No Drawing. Application June 11, 1952,
Serial No. 292,976

4 Claims. (Cl. 260—543)

This invention relates to a method of preparing certain phosphonyl chlorides and the like by the reaction of organo halides, e. g., alkyl chlorides, with phosphorus trichloride in the presence of oxygen.

This application is a continuation-in-part of our copending application Serial No. 202,396, filed December 22, 1950.

Phosphonyl chlorides and their derivatives are useful in various arts. For example, certain phosphonyl chloride derivatives (e. g., phosphonic acids and salts and esters thereof) are useful as lubricating oil additives, fire retardants and textile treating agents; others are useful in the preparation of wetting agents, emulsifying agents, plasticizers, dispersing agents; and still others are useful as anti-stripping agents for asphalt paving compositions, asphalt pipe coating compositions, etc.

Phosphonyl chlorides having uses in addition to those named above (e. g., useful as insecticides) and being still more difficult to prepare are those having halogen atoms (e. g., chlorine atoms) in the molecule other than the chlorine atoms attached to the phosphorus atom. These additional halogen atoms are attached to carbon atoms.

Readily usable methods are available for the preparation of phosphonyl compounds wherein the phosphorus atom is connected directly to an aromatic carbon atom. However, it has been difficult to prepare phosphonyl compounds wherein the phosphorus atom is directly connected to an aliphatic carbon atom. One method which has been used to produce this latter carbon-to-phosphorus linkage consists in heating the hydrocarbon with yellow phosphorus to phosphorize the hydrocarbon, followed by air-blowing to produce phosphonic acids. This method entails the use of high temperatures and the consequent dangers of phosphorus vapors. Also, this method is highly inefficient. Various methods have revolved around the reaction of phosphorus trichloride with a hydrocarbon, such methods requiring the presence of aluminum chloride or acetic anhydride. These methods are also expensive and inefficient.

Heretofore, only methods comparable with the above have been available for the preparation of phosphonyl compounds having a direct union between a carbon and a phosphorus atom. Now, because of the new reaction disclosed hereinbelow, these phosphonyl compounds may be prepared on a more extensive scale, which should result in and permit a more widespread use of these compounds.

It is a primary object of this invention to provide a means of preparing phosphonyl chlorides wherein the phosphorus atom is directly connected to an aliphatic carbon atom of an organic halide, said phosphonyl halide containing at least one carbon-to-halogen bond.

It is another object of this invention to provide a means of converting an aliphatic carbon-to-hydrogen bond of an aliphatic compound containing halogen atoms bonded to carbon atoms, to an aliphatic carbon-to-phosphorus bond without the loss of the halogen atom bonded to the carbon atom.

It is a still further object of this invention to provide a means of obtaining organo-phosphorus compounds containing at least one carbon-to-halogen bond and having a carbon-to-phosphorus linkage by a method using inexpensive organic compounds essentially hydrocarbon in structure and phorphorus trichloride as reactants, which method proceeds without the necessity of using high temperatures and expensive catalysts and gives high yields to useful carbon-to-phosphorus bonded compounds.

These and further objects of this invention are apparent from the following description and the appended claims.

It has been discovered that organo-phosphonyl chlorides containing a carbon-halogen linkage can be prepared by reacting an organic compound containing a halogen atom attached to a carbon atom with phosphorus trichloride in the presence of air or oxygen, said organic compound containing at least one aliphatic carbon atom, which aliphatic carbon atom is bound to at least one hydrogen atom, and said organic compound being free of sulfur and selenium.

The following chemical equation shows the reaction which takes place:

(1)
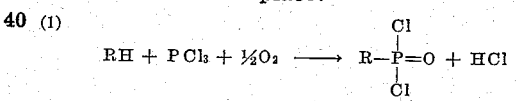

where R represents the organic radical of the organic compound, which organic compound contains at least one aliphatic carbon atom, and at least one halogen atom bonded to a carbon atom.

A competing reaction occurs. This competing reaction, which is believed to supply the energy of activation for the above reaction, and to be the start of a chain reaction, is as follows:

(2) 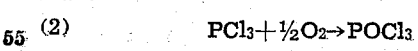

Thus, the reaction mechanism is wholly different from that of the processes formerly used to prepare compounds having a carbon-to-phosphorus linkage.

Organic compounds which may be treated according to the process of this invention to form the carbon-to-phosphorus bond include halogen-containing cyclo aliphatic hydrocarbons, wherein the cyclo aliphatic hydrocarbons are exemplified by cyclohexane, methyl cyclohexane, diethyl cyclohexane, cetyl cyclohexane, tetralin, etc.; halogen-containing aliphatic hydrocarbons, wherein the aliphatic hydrocarbons are exemplified by propane, isobutane, pentane, 2-methylpentane, 3-methylpentane, hexane, heptane, octane, isooctane, decane, tetradecane, hexadecane, hydrogenated olefin polymers; and halogen-containing aromatic hydrocarbons substituted by aliphatic or cycloaliphatic radicals, wherein the aromatic hydrocarbons are exemplified by toluene, xylene, hexylbenzene, cetyl benzene, octadecylbenzene, cyclohexylbenzene, etc. Mixtures of halogen-containing hydrocarbons may be similarly reacted, e. g., halogenated gasoline, kerosene, mineral lubricating oil fractions and paraffin wax. Also, halogen-containing substituted hydrocarbons, such as ethers, esters, ketones, etc., and unsaturated hydrocarbons, such as butene-1, isobutene-1, octene-1, isooctene-1, cetene, olefin polymers, etc., may be reacted. Where the substituent or unsaturated linkage is reactive with the phosphorus trichloride or oxygen, such reaction competes with the desired reactions leading to the carbon-to-phosphorus linkage, and may indeed predominate until all the more reactive groups or linkages are consumed. It is, therefore, preferred to use saturated halogenated hydrocarbons, or to use unsaturated halogenated hydrocarbons in which the unsaturated group is unreactive with phosphorus trichloride and oxygen under the conditions of the reaction.

As used herein, the term "halogen" includes chlorine, bromine, fluorine and iodine. That is, the organic compound reactants useful according to the present invention include organic chlorides, fluorides, bromides and iodides.

Organic halides which may be reacted with phosphorus trichloride and oxygen include ethyl chloride, ethyl fluoride, ethyl bromide, n-propyl chloride, isopropyl chloride, propyl fluoride, propyl bromide, n-butyl chloride, isobutyl chloride, sec.-butyl chloride, tert.-butyl chloride, amyl chloride, dodecyl chloride, cetyl chloride, cetyl bromide, chlorinated petroleum wax, trichloropentane, p-chlorotoluene, p-chlorophenyl ethane, cyclohexyl chloride, methyl chloroform, sym-dichloroethane, 1,1,2-trichloroethane, etc.

The following examples illustrate the phosphonyl compounds which can be prepared according to the process of this invention:

1-chloropropane-2-phosphonyl chloride
1-chloropropane-1-phosphonyl chloride
1-chloropropane-3-phosphonyl chloride
2-chloropropane-1-phosphonyl chloride
2-chloropropane-2-phosphonyl chloride
1-chlorobutane-2-phosphonyl chloride
1-chlorobutane-3-phosphonyl chloride
1-chloro-2-methylpropane-2-phosphonyl chloride
2-chlorobutane-3-phosphonyl chloride
2-chloro-2-methylpropane-1-phosphonyl chloride
1-chloropentane-2-phosphonyl chloride
1-chlorododecane-6-phosphonyl chloride
1-chlorooctadecane-4-phosphonyl chloride
"chlorowax" phosphonyl chloride
1,2-dichloroethane-1-phosphonyl chloride
1,1,1-trichloroethane-2-phosphonyl chloride
1,1,2-trichloroethane-2-phosphonyl chloride
mixed polychloropentane phosphonyl chloride
p-chlorophenylmethane phosphonyl chloride
o-chlorophenyl methane phosphonyl chloride
1-p-chlorophenylethane-1-phosphonyl chloride
1-chlorocyclohexane-2-phosphonyl chloride
1-chloroacetopentane-1-phosphonyl chloride
2-chlorodiethylether-2-phosphonyl chloride
1-carbomethoxypropane-2-phosphonyl chloride Other phosphonyl derivatives include the phosphonic acids prepared by hydrolyzing the above-mentioned chlorides, esters of phosphonic acids prepared by reacting the chlorides with alcohols, phosphonamides prepared by reacting the chlorides with ammonia and salts prepared by neutralizing the acids with basic materials.

It has been found that certain elements, when present in the organic compound or in the reaction mixture, inhibit the formation of the carbon-phosphorus bond according to the method of the present invention. For example, when sulfur or selenium is present per se or present as a part of the organic compound, the reaction of the present invention does not take place. It has been noted that sulfur and selenium prevent oxidation of phosphorus trichloride by oxygen according to the reaction noted in Equation No. 2 hereinabove. Since this oxidation appears to be the first step in a chain reaction leading to the formation of a phosphonyl chloride, inhibition of the oxidation process hinders the reaction of the present invention.

When nitro groups (—NO$_2$) are present in certain compounds (e. g. p-nitrotoluene), the reaction of this invention is somewhat inhibited. It is believed that this is not due to inhibition of the oxidation of phosphorus trichloride, but to steric hindrance or resonance effects. As is normally true in all reactions, it is obvious that where steric hindrances are too strong, or where resonance effects are powerful, the reaction of this invention takes place with difficulty. Such steric hindrances and resonance effects, however, are less felt by aliphatic carbon atoms which are further removed from the aromatic ring, as for example, in nitrophenyldecane.

Although phosphorus trifluoride may be used in place of phosphorus trichloride, the latter is much preferred. Air, of course, is the preferred oxidizing agent to be used in the reaction, but other forms of gaseous oxygen, such as pure oxygen and commercial oxygen may be used.

The reaction may be carried out in the gaseous or liquid phase, the temperature varying from elevated temperatures to subzero temperatures. Although the reaction is normally carried out at temperatures well below the cracking temperatures of the organic compound reactant, it is preferred to use temperatures in the range of about —70° C. to about +75° C. particularly from about 0° C. to about +75° C.

The proportions of reactants may ve varied considerably. As the molar ratio of phosphorus trichloride to organic compound is increased, the yield of phosphonyl chloride, based on organic compound charged, increases. Thus, in a specific case where petroleum white oil was reacted with phosphorus trichloride and oxygen, as the molar ratio of the phosphorus trichloride to hydrocarbon was increased from 0.25 to 2.0, the yield of phosphonyl chloride (based as hydrocarbon) increased from 7.5 to 44.5%. However, as the molar ratio was increased, the proportion of phosphorus trichloride converted to phosphorus oxychloride also increased. Hence, in any given case, the ratio chosen will depend upon relative costs of hydrocarbon and phosphorus trichloride.

The rate of addition of oxygen does not appear to affect the yield or purity, but as the rate of oxygen input is increased, evolution of heat also increases and more cooling is usually necessary. It is preferred to use an excess of oxygen, but it is also generally beneficial to add the oxygen at such a rate as will permit maintaining the reaction temperature between 0° C. and 75° C.

The physical conditions under which the reaction is carried out will depend to a considerable degree upon the nature of the reactants. Thus, phosphorus trichloride is relatively volatile (boiling point 76° C.), hence, unless pressure is used, the reaction temperature will be kept below 76° C. Where a volatile hydrocarbon reactant, such as ethyl chloride, is employed, it may be necessary to use a pressure system for the reactants. Similarly, if the reaction is made at a temperature above that of the boiling point of phosphorus trichloride (76° C.), it may be necessary to use a pressure system.

Where a normally gaseous organic compound is reacted, the gaseous organic compound and oxygen may be bubbled through liquid phosphorus trichloride, or the reaction may be accomplished in liquid phase under pressure. Where the organic compound is usually liquid, it may be mixed with phosphorus trichloride, and oxygen may be bubbled through the mixture. Where the organic compound is normally solid, it may be melted or dissolved in a suitable solvent, such as carbon tetrachloride and treated as in the case of normally liquid hydrocarbon. Another suitable reaction solvent is benzene.

Methods of recovery and treatment of reaction products will likewise depend in a large degree upon the nature of the materials used, and also upon the ends in view. Thus, where the resultant phosphonyl chloride can be distilled without decomposition, recovery can be effected by fractional distillation, and, if necessary, vacuum distillation may be used. Unreacted organic compound, phosphorus trichloride (if any), and phosphorus oxychloride will come off first, followed by the phosphonyl chloride.

Phosphonyl chlorides produced by the reaction of the present invention may be treated with water to produce the corresponding phosphonic acids by hydrolysis. Where the resulting phosphonic acids are water-soluble, they may be extracted with water. Where the phosphonic acids produced by hydrolysis are water insoluble, the reaction mixture may be extracted with an aqueous alcoholic solution of caustic alkali, and the alkaline extract acidified to precipitate the free acids.

The phosphonic acids may be reacted with basic substances to form the corresponding salts. For example, the phosphonic acids may be reacted with sodium hydroxide to prepare the sodium salts of the phosphonic acids.

This reaction is extraordinarily simple to carry out. Thus, as described in detail in the specific examples below, oxygen is bubbled through the mixture of the organic compound and phosphorus trichloride. Unreacted organic compound and phosphorus oxychloride are removed from the reaction mixture by distillation at reduced pressure. The crude organo phosphonyl chloride is then distilled off and purified further by re-distillation. The specific examples described hereinbelow serve further to illustrate the practice and advantages of the invention.

*Example 1.—Preparation of chlorohexane phosphonic acid*

A mixture of 42.3 parts by weight of n-hexyl chloride and 241 parts by weight of phosphorus trichloride was placed in a glass cylinder having a sintered glass bubbling plate at the bottom and fitted with a condenser and a thermometer. Oxygen was bubbled through this mixture at 55 to 60° C. until the reaction was complete. The chlorohexane phosphonyl chloride was hydrolyzed to the chlorohexane phosphonic acid. The chlorohexane phosphonic acid reaction mixture was extracted separately with hexane, ethyl ether and benzene. The product recovered from the ether extract contained 15.8% phosphorus (theory=15.5). The $pK_1$ and $pK_2$ values were, respectively, 4.4 and 9.0. The hexane extract product was a dark, viscous oil, the ether extract product was a dark brown viscous oil, and the benzene extract product was a brown viscous oil.

*Example 2.—Preparation of p-chlorphenyl methane phosphonic acid*

A mixture of 44.4 parts by weight of p-chlorotoluene and 240 parts by weight of phosphorus trichloride was placed in a glass apparatus, and oxygen was bubbled through this mixture at 55 to 60° C. until the reaction was complete. After the reaction with oxygen, the whole reaction mixture was slowly poured into 2000 parts by weight of distilled water to hydrolyze the phosphonyl chloride. After three hours of vigorous stirring, the reaction mixture was extracted with hexane, then further extracted with ethyl ether. The ether extract resulted in the recovery of a light brown solid having a melting point ranging from 302 to 310° F. The ether extract product contained 11.59% phosphorus (theory=15.0%) and 16.4% chlorine (theory=17.18%). The $pK_1$ and $pK_2$ values were, respectively, 4.5 and 9.25.

The hexane extract, after removal of the hexane, consisted essentially of unreacted p-chlorotoluene.

*Example 3.—Preparation of trichlorethane phosphonic acid*

A mixture of 44 parts by weight of methyl chloroform and 227 parts by weight of phosphorus trichloride was placed in a glass apparatus. Oxygen was bubbled through this mixture at 55 to 60° C. until the reaction was believed to be complete. This reaction mixture was slowly poured into water, then extracted with ethyl ether. The product recovered from the ether extract was a light brown solid containing 7.04% phosphorus (theory=13.4%), and having a pK value of 5.3. The phosphonyl chlorides and the phosphonic acids prepared according to the methods of this invention are useful as intermediates in subsequent preparations.

In the preparation of phosphonyl chlorides according to the present invention, phosphorus oxychloride and hydrogen chloride are also formed. The hydrogen chloride is removed as a gas, after which the unreacted phosphorus trichloride and the phosphorus oxychloride are separated from the phosphonyl chloride by distillation. The unreacted phosphorus trichloride and the phosphorus oxychloride may then be heated with carbon for conversion of the phosphorus oxychloride to phosphorus trichloride according to the following equation:

$$POCl_3 + C \rightarrow PCl_3 + CO$$

wherein the carbon (C) may be obtained as charcoal, graphite, petroleum, coke, lamp black briquets, bone charcoal, wood charcoal, etc.

The process comprises heating phosphorus oxychloride with carbon at temperatures from about 500° F. to about 900° F., preferably 600° F. to 700° F., the temperature depending on the nature of the carbon used. The gases leaving the reaction zone are conducted to a condenser and gas separator where the carbon monoxide is separated. The liquid, which consists of a mixture of phosphorus trichloride and phosphorus oxychloride, may be recycled to the reaction zone in the further production of organo-phosphonyl chlorides, or it may be fractionated to produce an essentially pure phosphorus trichloride.

The use of this process of recovering phosphorus trichloride from phosphorus oxychloride reduces the overall cost of the phosphonyl chloride, and also eliminates the need for an outlet for the phosphorus oxychloride.

We claim:

1. The method of producing organo-phosphonyl chlorides, which comprises reacting an organic compound containing at least one carbon-to-halogen bond and containing two carbon atoms, at least one of which is an aliphatic carbon atom bonded to at least one hydrogen atom, with phosphorus trichloride in intimate contact with oxygen at tempeartures between —70° C. and +75° C., said halogenated organic compound being free of sulfur and selenium.

2. The method of claim 1 wherein the reaction mixture is maintained at a temperature between about 0° C. and about +75° C.

3. The method of producing halogenated ethane-phosphonyl chlorides which comprises reacting a halogenated ethane containing at least one aliphatic carbon atom bonded to at least one hydrogen atom, with phosphorus trichloride in intimate contact with oxygen, at temperatures from —70° C. to about +75° C.

4. The method of claim 3 wherein said halogenated ethane is methyl chloroform.

References Cited in the file of this patent

Jensen et al. (1) J. A. C. S. vol. 70, p. 3880 (1948).

Jensen et al. (2) J. A. C. S. vol. 71, p. 2384 (1949).

Kosolopoff, "Organophosphorus Compounds" (1950) pp. 66 and 67.